United States Patent
Schoen et al.

(10) Patent No.: US 11,176,610 B2
(45) Date of Patent: *Nov. 16, 2021

(54) ANONYMOUS TRADING SYSTEM

(71) Applicant: EBS Group Limited, London (GB)

(72) Inventors: John Edward Schoen, New York, NY (US); Nasir Ahmed Zubairi, London (GB); Edward R. Howorka, Denville, NJ (US); Neena Jain, South Plainfield, NJ (US)

(73) Assignee: EBS Group Limited, London (GB)

( * ) Notice: Subject to any disclaimer, the term of this patent is extended or adjusted under 35 U.S.C. 154(b) by 16 days.

This patent is subject to a terminal disclaimer.

(21) Appl. No.: 16/547,030

(22) Filed: Aug. 21, 2019

(65) Prior Publication Data

US 2019/0378212 A1 Dec. 12, 2019

Related U.S. Application Data

(60) Continuation of application No. 12/858,741, filed on Aug. 18, 2010, now Pat. No. 10,430,877, which is a
(Continued)

(51) Int. Cl.
*G06Q 40/00* (2012.01)
*G06Q 40/04* (2012.01)
*G06Q 20/10* (2012.01)
*G06Q 30/08* (2012.01)
*G06Q 40/02* (2012.01)

(52) U.S. Cl.
CPC ............ *G06Q 40/04* (2013.01); *G06Q 20/10* (2013.01); *G06Q 30/08* (2013.01); *G06Q 40/025* (2013.01)

(58) Field of Classification Search
CPC ........ G06Q 40/04; G06Q 20/10; G06Q 30/08; G06Q 40/025
See application file for complete search history.

(56) References Cited

U.S. PATENT DOCUMENTS

| 5,136,501 A | * | 8/1992 | Silverman | ............ G06Q 40/025 705/37 |
| 5,375,055 A | | 12/1994 | Togher | |

(Continued)

FOREIGN PATENT DOCUMENTS

| CA | 2383126 A1 | 12/2001 |
| EP | 0411748 A2 | 2/1991 |

(Continued)

OTHER PUBLICATIONS

Ferreira, et al.: "Time series analysis for minority game simulations of financial markets", Instituto de Fisica Teorica, Universidade Estadual Paulista, 01405-900 São Paulo, São Paulo, Brazil, accepted Oct. 25, 2002 (Year: 2002).*

(Continued)

*Primary Examiner* — Edward J Baird
(74) *Attorney, Agent, or Firm* — Lempia Summerfield Katz LLC

(57) ABSTRACT

An anonymous computerized trading system matches orders by conducting auctions at specified times. As well as entering orders, participants assign credit limits for the duration of the auction, thus minimizing the time for which credit is allocated to the system.

20 Claims, 4 Drawing Sheets

Related U.S. Application Data division of application No. 10/532,968, filed as application No. PCT/US03/33149 on Oct. 21, 2003, now Pat. No. 8,055,572.

(60) Provisional application No. 60/421,795, filed on Oct. 29, 2002.

(56) References Cited

U.S. PATENT DOCUMENTS

| | | | |
|---|---|---|---|
| 6,012,045 A | 1/2000 | Barzilai | |
| 6,098,051 A | 8/2000 | Lupien | |
| 6,317,727 B1 | 11/2001 | May | |
| 6,421,653 B1 | 7/2002 | May | |
| 6,519,574 B1 | 2/2003 | Wilton | |
| 6,671,674 B1 | 12/2003 | Anderson | |
| 6,996,540 B1 * | 2/2006 | May | G06Q 30/08 705/35 |
| 7,290,056 B1 | 10/2007 | Mclaughlin, Jr. | |
| 7,634,438 B2 | 12/2009 | Penney | |
| 7,672,893 B1 | 3/2010 | Naratil | |
| 7,925,566 B1 | 4/2011 | Naratil | |
| 7,991,683 B2 | 8/2011 | Setz | |
| 8,571,976 B1 * | 10/2013 | Butcher, III | G06Q 40/025 705/39 |
| 8,595,120 B1 | 11/2013 | Newell | |
| 2001/0037284 A1 | 11/2001 | Finkelstein | |
| 2001/0042040 A1 | 11/2001 | Keith | |
| 2002/0035534 A1 | 3/2002 | Buist | |
| 2002/0091617 A1 | 7/2002 | Keith | |
| 2002/0091624 A1 | 7/2002 | Glodjo | |
| 2002/0111896 A1 * | 8/2002 | Ben-Levy | G06Q 40/00 705/37 |
| 2002/0116314 A1 * | 8/2002 | Spencer | G06Q 40/04 705/37 |
| 2002/0161690 A1 * | 10/2002 | McCarthy | G06Q 40/04 705/37 |
| 2003/0004852 A1 | 1/2003 | Burns | |
| 2003/0009421 A1 | 1/2003 | Bansal | |
| 2003/0018561 A1 | 1/2003 | Kitchen | |
| 2003/0055776 A1 | 3/2003 | Samuelson | |
| 2003/0115128 A1 * | 6/2003 | Lange | H01L 29/4941 705/37 |
| 2003/0120568 A1 * | 6/2003 | Chacko | G06Q 40/02 705/35 |
| 2003/0177126 A1 | 9/2003 | Weingard | |
| 2004/0044609 A1 | 3/2004 | Moore | |
| 2004/0059666 A1 | 3/2004 | Waelbroeck et al. | |
| 2007/0106594 A1 | 5/2007 | Mahoplus | |
| 2007/0239591 A1 | 10/2007 | May | |
| 2010/0198423 A1 | 8/2010 | Hirst | |
| 2013/0333042 A1 | 12/2013 | Saika | |

FOREIGN PATENT DOCUMENTS

| | | | |
|---|---|---|---|
| EP | 0625275 A1 | 11/1994 | |
| GB | 2352844 A | 2/2001 | |
| GB | 2363876 A | 1/2002 | |
| GB | 2364588 A | 1/2002 | |
| WO | WO0195226 A2 | 12/2001 | |
| WO | WO-0219223 A1 * | 3/2002 | G06Q 40/04 |
| WO | WO-02057871 A2 * | 7/2002 | G06Q 40/00 |
| WO | WO0159661 A9 | 10/2002 | |

OTHER PUBLICATIONS

Citibank Press Release: Instinet and Citibank Announce Strategic Alliance to Create the Instinet FX Cross, May 20, 2002, New York.
Financial Markets IT/FT press clipping dated Jun. 3, 2002.
http://www.investorwords.com/3495/order.html.
International Search Report in International Application No. PCT/US03/33149, dated Oct. 7, 2004.
Wipperfurth, Heike: "After Three Years of Secrecy, Ex-MorganSwaps Traders Set to Launch Blackbird: Ambitious new systemaims to change the way swaps are traded", The Investment Dealers' Digest: IDD; New York (Jan. 4, 1999) (Year: 1999) (Year: 1999).

* cited by examiner

|  | Bank A (M €) | Bank B (M €) | Bank C (M €) | Bank D (M €) |
|---|---|---|---|---|
| Bank A | - | 100 | 0 | 0 |
| Bank B | 100 | - | 100 | 0 |
| Bank C | 0 | 100 | - | 100 |
| Bank D | 0 | 0 | 100 | - |

ANONYMOUS TRADING SYSTEM

CROSS REFERENCE TO RELATED APPLICATIONS

This application is a continuation under 37 C.F.R. 1.53(b) of U.S. patent application Ser. No. 12/858,741 filed Aug. 18, 2010 now U.S. Pat. No. 10,430,877, which is a divisional of U.S. patent application Ser. No. 10/532,968 filed Nov. 17, 2005 now U.S. Pat. No. 8,055,572, which is a National Stage filing under 35 U.S.C. 371 of International Application No. PCT/US03/33149, filed on Oct. 21, 2003 which claims priority benefit under 35 U.S.C. 119(e) from U.S. Provisional Application No. 60/421,795, filed on Oct. 29, 2002, each of which are hereby incorporated by reference in their entirety and relied upon.

FIELD

This invention relates to anonymous trading systems for trading fungible instruments. It is particularly concerned with auction-based trading systems.

SUMMARY AND DESCRIPTION

Anonymous trading systems are used widely to trade fungible instruments, particularly financial instruments such as foreign exchange (FX) products. These systems have been very successful and are used for the majority of transactions in some instruments, for example FX spot.

As their name suggests, anonymous trading systems do not allow the participants to know the identity of potential counterparties to a transaction until the trade has been confirmed. One well known system operated by EBS Dealing Resources Inc, and described in EP-A-625275, requires traders to input quotes in the forms of bids and offers into the system via their trader terminals. These quotes are matched with other quotes in the system by a matching engine or arbitrator. Where a match is found, a deal will be executed between the parties, once it has been established that each party has sufficient credit with the other for the deal. A market distributor is arranged between the arbitrator and a bank node, at which is a credit matrix indicative of credit assigned by a bank to all counterparties on the system. The market distributor is responsible for constructing a market view for each trading floor based on their credit as represented by the binary credit matrix stored at the market distributor. Thus, traders at a given trading floor are only shown quotes input into the system by parties with whom they have credit. The actual credit limits are stored at bank nodes in the EP-A-625275 system.

Rather than waiting for the matching engine to match visible orders input into the system, traders can input invisible hit and take orders which are on offer to sell or buy a quote at the price and for the amount of the offer.

Once a deal has been concluded, details of the trade, including the identity of the parties and the price at which the deal was concluded, are distributed to all trading floors. Thus, the system is no longer anonymous once deals have been completed.

This type of system has been highly successful and is most useful for trading regular amounts of an instrument. However, it is not ideal for trading large amounts outside the regular trading range. If one considers the example of FX Spot a typical deal amount is between $1M and $5M ($1 to 5 million). If a bank needs to trade a large amount, for example $50M, it is very unlikely to find a single party willing to trade the whole amount. Instead, a number of separate trades, each probably in the range of $1M to $5M will be concluded. While this order is being filled, the traders' screen will show details of the deals so far concluded. They will see a string of deals all showing the party with the $50M quote on the same side of the deal. The market will conclude that there is a party who needs to buy or sell a large amount of currency and adjust their prices accordingly to the detriment of the party with the large amount to buy or sell.

There is therefore a need for a system which facilitates the trading of large amounts of an instrument without prejudicing the ability of the trading party to achieve optimum market prices.

A further disadvantage with trading large amounts of existing systems relates to credit limits. In a system such as the EBS system mentioned above, each trading floor allocates credit to each other counterparty on the system. These credit limits are typically updated on a daily basis. The credit assigned to that particular trading system may be allocated from the financial institution's overall credit pool for all its trading activities. Thus, credit assigned to the anonymous trading system cannot be used for other trading activities and if not used on the trading system represents lost revenue opportunities for the institution. If an institution wants to trade large amounts for example $50M in the FX spot example, it must reserve correspondingly large amounts of credit to likely counterparties on the anonymous trading system. This is a high credit overhead which may reduce the institutions overall trading capacity. Some institutions choose not to reserve credit they assign to various trading activities. However, this runs the risk of exceeding overall credit limits.

There is, therefore, a need for a trading method and system which allows large amounts of an instrument to be traded without compromising the institutions overall trading effectiveness by tying up large amounts of credit for long periods of time.

Broadly, in one aspect of the present invention addresses the disadvantages discussed by providing an anonymous auction system in which auctions are held at fixed times and for which credit is allocated before the auction and returned after the auction. In another aspect the invention allows trades to be executed at benchmark prices published at various times.

More specifically there is provided a method of trading a fungible instrument comprising: notifying potential participants of an auction time; receiving from participants orders related to the auction; receiving from participants credit limits for execution of orders input by the participants with other participants; conducting the auction at the time notified to the participants by matching the orders received; notifying the owners of matched orders; and notifying the participants of credit allocated to the auction but not used in matched orders. The invention also provides a method of anonymous computerized trading of fungible instruments comprising: Sending an electronic message to potential participants notifying the participants of an auction time; receiving at a computerized trading system, electronic messages from participants including orders related to the auction; receiving at the computerized trading system, electronic messages including participant credit limits for execution on the computerized trading system of orders input by the participants with other participants; conducting at the computerized trading system the auction at the time notified to the participants by matching the orders received; notifying the owners of matched orders by sending electronic messages to the owners of matched orders; and sending an electronic message to participants who had submitted credit limits notifying those participants of credit allocated to the auction but not used in matched orders.

The invention further provides a computerized trading system for anonymous trading of fungible instruments comprising: an auction administrator for sending electronic messages to potential participants notifying the participants of an auction time; trader terminals at participants for sending to the trading system electronic order messages related to the auction, and electronic credit limit messages setting credit limits for trades on the computerized trading system by the participants with other participants; a store for storing the orders and credit limits received from the participants; a matching engine for conducting at the computerized trading system the auction at the time notified to the participants by matching the orders received; a deal notifier for notifying the owners of matched orders by sending electronic messages to the owners of matched orders; and a credit notifier for sending electronic messages to participants who had submitted credit limits notifying those participants of credit allocated to the auction but not used in matched orders.

Embodiments of the invention have the advantage that credit is only assigned to the auction system for a short time. In a preferred embodiment, credit is assigned no later than a predetermined time before the auction, for example 1 minute, and the participating institution is notified of unused credit a predetermined time almost immediately after the auction, for example 1 minute. Thus, the credit needs only be reserved from the trading institution's other activities for a very short time, in this example as little as 2 minutes.

Embodiments of the invention also have the advantage that the auction is anonymous. Details of orders placed in the system by participants are not communicated to other participants. Details of successful matches during the auction are only communicated to the successful parties. Thus, it is not possible for other parties on the system to see that a given party has a large amount to trade.

Preferably, credits limits may be renewed automatically for future auctions on request from a participant. The facilitates participation in the auction process where a participant has regular lines of credit assigned to trading parties.

Preferably, the initial notification of the auction identifies the auction time, the instrument to be auctioned and the minimum order amount. Preferred systems may be used to trade a wide variety of instruments, both financial and non-financial. By setting a minimum amount, the system can be reserved for the trading of amounts greater than a certain value, for example greater than the amounts usually traded on conventional anonymous trading systems.

Preferably, participants can take part in the auction not only by submitting orders but also by making their credit available to third parties to increase the liquidity of the auction market. Such participants submit credit limits for use in matching orders between other participants lacking bilateral credit. Preferably the participant also submits an identification of other participants whose credit limits may be used to match orders entered by the participants. The matching engine can then match orders received from participants who do not have bilateral credit, using the credit of an intermediary having bilateral credit with the participants submitting the matched orders.

The intermediary may comprise a single participant or a chain of intermediary parties, each party in the chain having bilateral credit with adjacent parties in the chain, a first of said chain of intermediary parties having bilateral credit with the participant submitting one side of the matched order and a second of said chain of intermediary parties having bilateral credit with the participant submitting the other side of the matched order. This daisy chaining of credit further increases the liquidity of the auction market thus making it more likely that orders will be matched.

The invention also provides, according to a second aspect, a method of trading a fungible instrument, comprising: fixing benchmarks for the instrument to be traded at intervals during the trading day; receiving from participants orders to trade at a benchmark price; receiving from participants credit limits for execution of orders input by the participants with other participants; matching orders received on the basis of bilateral credit; notifying the owners of matched orders; and executing the matched order when the benchmark price indicated in the order is fixed.

This aspect of the invention has the advantage that orders entered are tied to benchmark prices. This enables them to be matched immediately even though the orders are not executed until the benchmark indicated in the order is fixed. As a result, the trader does not have to wait until the trade takes place at periodic times through the trading day to see that his position is covered. This prevents any rush into the market by traders anxious to cover their positions once the results of an auction become known.

DESCRIPTION OF THE FIGURES

Embodiments of the invention will now be described, by way of example, and with reference to the accompanying drawings, in which.

DETAILED DESCRIPTION

Figure 1:
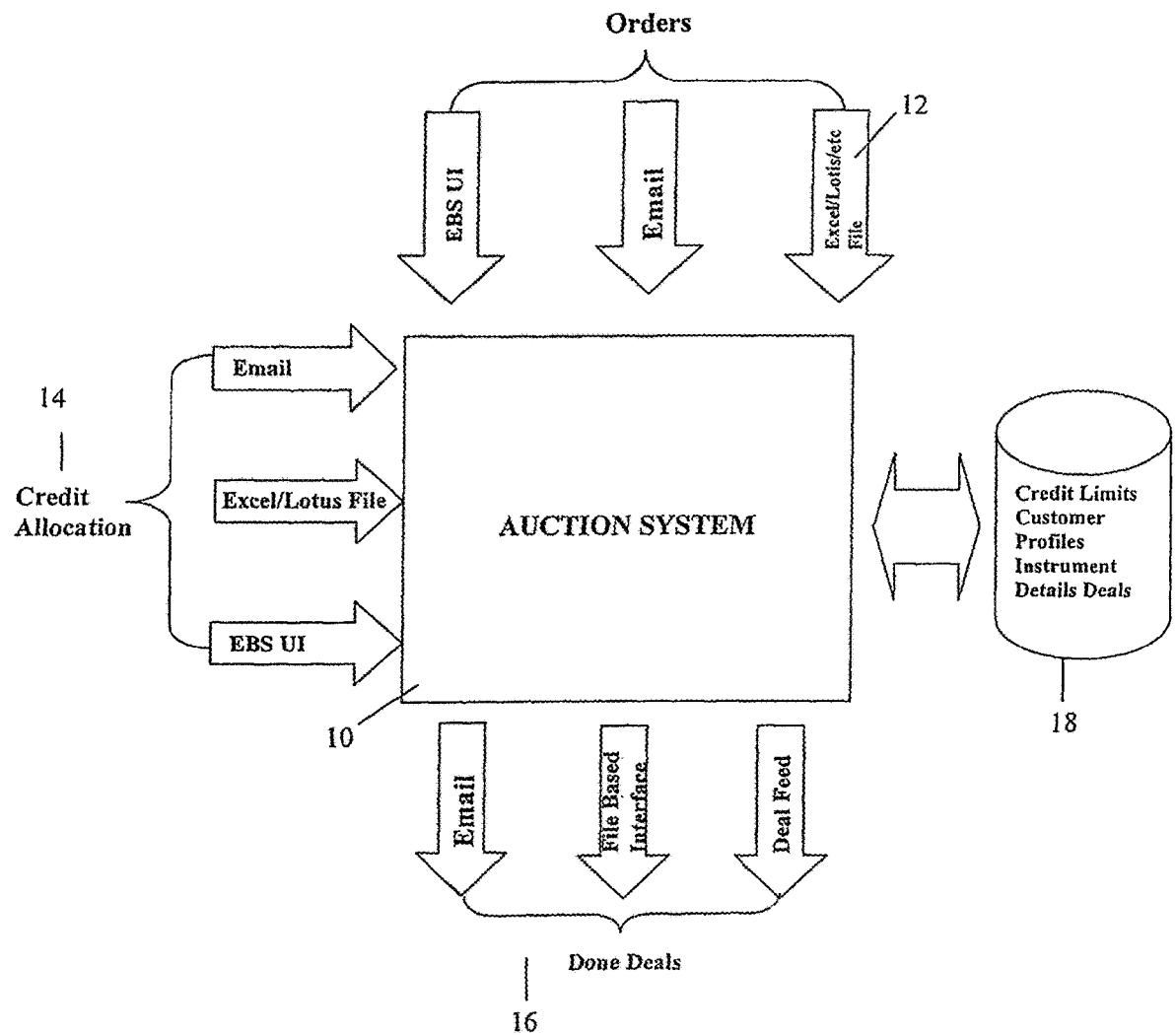
FIG. 1 is a logical view of a system embodying the invention.

Referring to the figures, the system embodying the invention to be described is an auction-based system. Potential trading parties submit orders into the system and auctions are held at predetermined intervals, for example, once or twice daily. Participants in the auction need only make credit available for the duration of the auction. If it has been reserved, or blocked off, by the institution participating in the auction, but not used in the auction, it can be swiftly made available again to other parts of the institutions' trading systems.

The auction is anonymous but customers submit orders rather than quotes into the system. A quote requires both a price and a quantity. Orders submitted in this embodiment are limit type orders. Thus, they are buy or sell orders either at a specified price or better. This greatly increases the chances of a match being made. Thus, there are no bids or offers submitted to the system. At the designated auction time, a matching engine matches the orders entered into the system and notifies the successful parties of the orders that have been executed. No other parties are notified of the successful deals. Unsuccessful orders remain wholly anonymous.

Potential participants are notified of the auction time for a given financial instrument or instruments. For example, a USD/EUR spot auction may be held at 2:00 pm London time. Potential participants are invited to submit orders for amounts larger than a pre-defined amount, for example $50M or above. A cut off point of a given time before the auction is set, for example, 1 minute. Orders received after than time will not be considered in the auction.

Orders are matched on the basis of bilateral credit existing between counterparties. Each potential party must submit credit allocation to other counterparties into the system before the auction can take place. Again, this may be required to have been completed a set time before the auction takes place, for example 1 minute.

Once allocated to the auction system, if the party allocating the credit chooses to reserve the credit, the credit may not be used for any other purpose. However, the participants are notified of the results of the auction directly after the auction, for example no later than two minutes after the auction. This allows them to reduce the credit to reflect transactions made during the auction and to unreserve any unutilized credit. Credit is reassigned for each auction. This may be done either by customers submitting fresh credit limits or by reviewing the limits for the previous auction automatically.

Matching may be performed using a matching engine of the type disclosed in EP-A-625275 in which matching is performed by the arbitrator. The matching algorithm in existing anonymous trading system matches on a price, time priority such that if two equally priced orders could be matched, the first order to be submitted is matched. This paradigm is not appropriate for the present auction-based system and matching is performed by attempting to give the best price available to a customer based on its bilateral credit whilst attempting to maximize the trading volume and surplus.

For any trading system to operate effectively, there must be liquidity in the market. The lack of credit between possible counterparties has a detrimental effect on liquidity as potential deals cannot be executed. This may be overcome by market participants offering their credit to counterparties by acting as prime brokers. Customers may indicate whether they are willing to trade through a prime broker and whether they are willing to act as a prime broker. Where they act as a prime broker, they indicate to the system those customers on whose behalf they are willing to act and the limits for each customer. The manner of this loaning of credit is discussed below.

FIG. 1 illustrates, schematically, a logical view of the system. The auction system, which comprises a computerized matching engine and a store for credit limits, prime broker credit limits and orders, is illustrated at 10 and receives, for each auction, orders for the auction 12 from customers. These may be received in any form, for example by e-mail or as a spreadsheet file, or in EBS or other user interface format. Other ways of entering the order are possible. Thus, orders are entered into the auction system by an electronic message sent to the auction system by customers and stored by the system until the auction. Similarly, credit limits 14 are allocated to the auction system in an electronic message sent to the system by customers and stored until the auction. The credit information may be in any suitable format, such as those mentioned above.

On completion of an auction, the system outputs electronic messages containing information about done deals. These done deal messages 16 are sent by a notifier to the parties to the done deals only and are also in any suitable format. A credit notifier sends electronic messages to participants notifying them of any unused credit with the participants may then unreserve.

The auction system may exchange messages with a database or series of databases 18 which hold information relevant to an auction. This may include the details of the instrument the subject of the auction; credit limits, where these limits are updated automatically from previous auctions; customer profiles, including a willingness to act through or as a prime broker; and a deal log. The databases may be any convenient commercially available databases.

In the embodiment described, the central matching engine in the system may support trading of any financial instrument and details of the instrument are provided from the database 18. Alternatively, the system could be limited to one or a few instruments which are stored on the system.

Figure 2:
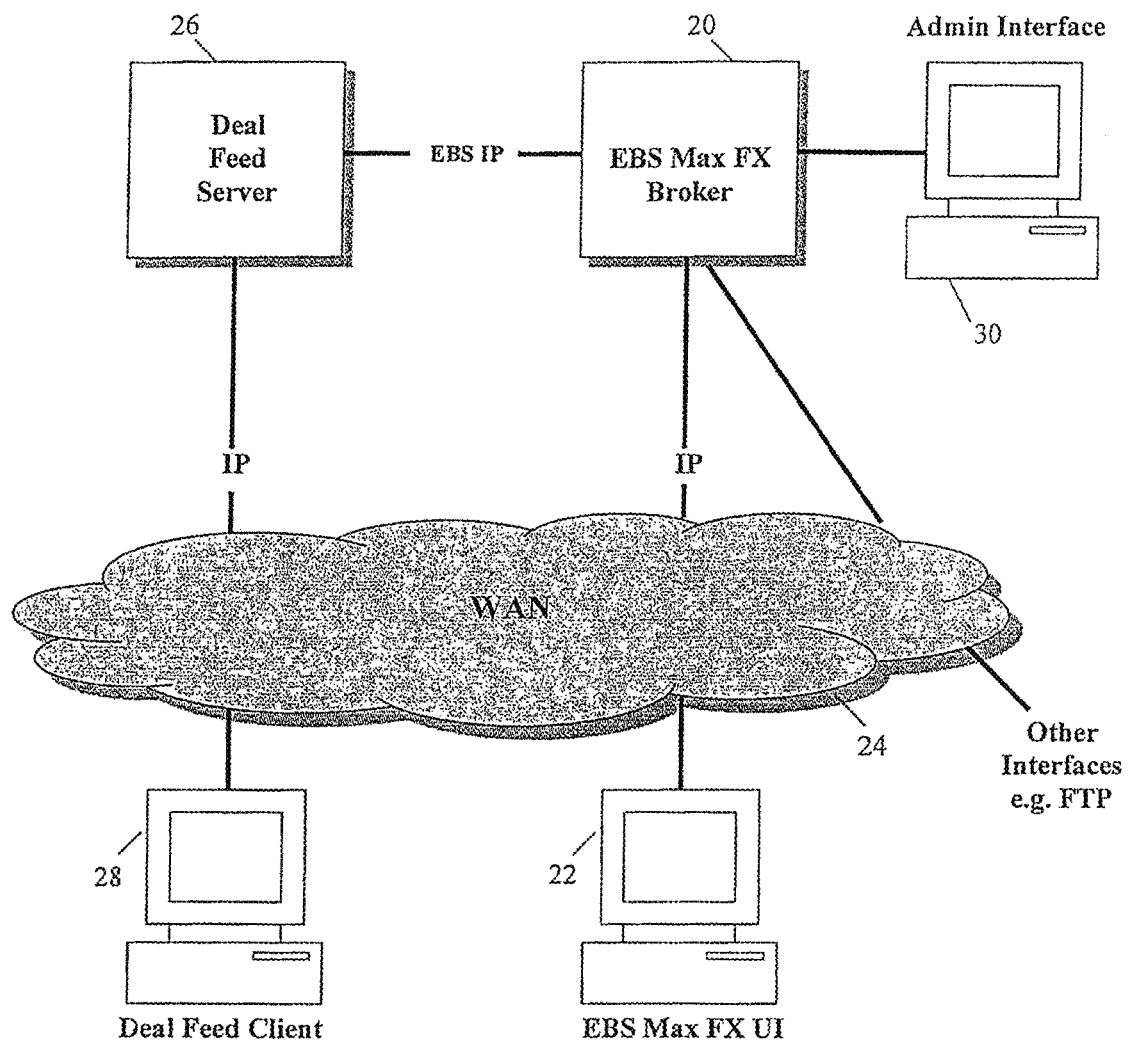
FIG. 2 is a schematic view of a system embodying the invention.

FIG. 2 shows the hardware components of the system. The trading system including the matching system stores and database is shown at 20 and is connected to customers through user interfaces 22. The matching system communicates with the user interfaces 22 via a wide area communications network such as the Internet or a private communications network 24. A single user interface 22 is shown. In practice, there are many interfaces, one per customer or per trader at a customer. Communication with the auction system may be via Internet Protocol (IP) or some other interface such as File Transfer Protocol (FTP). The interface at each customer is provided as a conventional computer workstation.

The auction system 22 also communicates with a deal feed server 26 which receives completed deal information from the auction system 20 on completion of an auction. The server 26 transmits this information over a telecommunications network 24 to a deal feed client 28. Not all parties operating on the system will use the deal feed server. For those that do not, the notifier sends the trader terminal an electronic deal notification message. In practice there will be many deal feed clients. The deal feed clients pass the deal information to back office computer systems at the institutions participating in successful auctions for settlement of the deals that have been made.

As shown in FIG. 1, customers wishing to participate in the auction must notify the auction system of credit limits for various counterparties within the system. These credit limits are specific to the auction system. These limits must be submitted by a predetermined time, for example 1 minute, before the predetermined auction time. Once an auction has taken place, customers may either renew their credit limits automatically, effectively applying the same limits as the previous auction or resubmit fresh limits for a given auction.

In the auction system described, for the system to be viable, it is important that there is sufficient liquidity available. The liquidity is enhanced, in a preferred embodiment of the invention, by allowing customers to lend their credit to one another. As part of the submission of credit limits, as well as indicating how much credit a customer extends to trades with each counterparty, the customer notifies the auction system of credit limits it is willing to lend to various counterparties trading on the system. Again, this notification may be in any of the forms discussed above and is made by a predetermined time, such as 1 minute, before the auction takes place. Similarly, customers may notify the system if they are willing to borrow credit from another lender and, if so, how much. Conveniently, these notifications may be sent with the other credit limit notifications.

The orders submitted must be submitted before the cut-off time mentioned above. However, orders may be withdrawn up to a predetermined period before the auction commences, for example 5 seconds. Orders are submitted either as buy or sell orders or both. Although the auction system knows the identity of the participating party, the orders are submitted anonymously and remain anonymous as no other party on the system is made aware of the order. The only exception is the counterparty to a successful auction who is notified of the party which whom they have dealt. This is necessary for settlement purposes. Orders are submitted as limit orders at a specific price or better.

Once the auction time arrives, the auction system matching engine takes all orders that were received before the cut-off time and not subsequently withdrawn, and attempts to match them based on an algorithm that attempts to maximize trading volumes and maximize the surplus. Matching is based on bilateral credit and matches are made to give the best price to the customer either based on its own credit or third-party credit if credit has been borrowed.

Once the matching has been completed, all unmatched orders left in the auction are cancelled. The customer is informed of the amount outstanding of each order they posted to the system. The customer can then unreserve assigned credit if appropriate and reduce credit by the amount of the transactions. The auction lasts for a very short time with matching being near-instantaneous.

It will be appreciated, therefore, that credit needs to be allocated, and reserved if this is how a particular institution handles credit, to the auction system for a very short time. If orders are submitted with credit allocating at the last possible time 1 minute before the auction and the participant notified of unutilized credit 1 minute after the auction so that it can be unreserved, the credit has been assigned only for 2 minutes per auction. In practice, the time is likely to be a little longer but is very considerably less than the time for which credit is assigned and reserved to a conventional anonymous trading system.

The matching engine used may be similar to that used in the present system of the applicant referred to in the introduction and disclosed in EP-A-625275 or it may be based as the broker model disclosed in GB-A-2363876. Matching engines are well known to those skilled in the art.

Once the auction has been completed, customers will be notified of deals through one of the interfaces described above with reference to FIG. 1. The deal notification is sent a very short time after completion of the deal, for example, no more than one minute. Where the customer includes a deal feed client, done deals are received from the deal feed server 24 at the deal feed client 26 as described above in relation to FIG. 2.

As the system is completely anonymous, and in contrast to other anonymous trading systems, deals are not reported to the financial markets or incorporated into price feeds supplied to the markets.

As mentioned above, no orders are displayed to customers so that customers cannot see what other prices have been submitted to the system. Nor can they see what deals have been completed. The customer user interface 22 is used simply to input auction data into the system and to receive notifications from the system, for example of auction times and instruments to be auctioned. The customer user interface provides for the following customer functionality:

1. Submission of Orders. Multiple orders may be submitted at different prices or different amounts for the same auction;

2. Credit Lending Limits. Customers define credit limits for counterparties to which it is willing to lend credit. These limits define how much trading the counterparty can do in this counter's name;

3. Credit Trading Limits. These define the credit limits for counterparties with which it is willing to trade. The limits define how much trading this customer can do with each counterparty;

4. Credit Borrowing Limits. The customer defines credit limits for lenders from which it is willing to borrow credit;

5. Settlement Instructions. Customers can set up settlement instructions; and

6. Deal Log. Customers may view the deals they have done on the auction system.

FIG. 2 also shows a system administration interface 30 which allows the system administrator to perform administrative functions with respect to the system. The administration interface 30 includes the following functionality:

1. Instrument Definition. The definition of new instruments to be auctioned, and their characteristics, such as the minimum amount to be traded and their price format;

2. Customer Registration. This allows new customers to be registered on the system to participate in auctions;

3. Auction Setting. This allows the times of auctioning to be set at various times in the trading day for various instruments;

4. Customer Profile. Customer profiles may be kept by the administrator and may include a unique identifier, name, contact option (e-mail, file interface etc.), contact information such as e-mail and IP address etc.; and 5. Broadcast. This allows the administrator to broadcast certain messages through the system to all customers. Broadcast messages may include auction times, a new instrument or a new customer joining the system. The latter is important as existing customers need to set credit limits for that customer.

The loaning and borrowing of credit will now be described in more detail. In order to increase the liquidity of the auction market, customers can act as prime brokers by lending their credit to other counterparties. They do not have to put orders into the system to participate in the auction and so add liquidity. They merely need to make their credit available. This may be done by automatically renewing credit limits after every auction. There may be multiple prime brokers in the auction system and customers indicate, via their interfaces, if and with whom they are willing to trade through prime brokers. Prime broker customers indicate the customers they are willing to broker for and the credit limit for each customer.

Figures 3, 4:
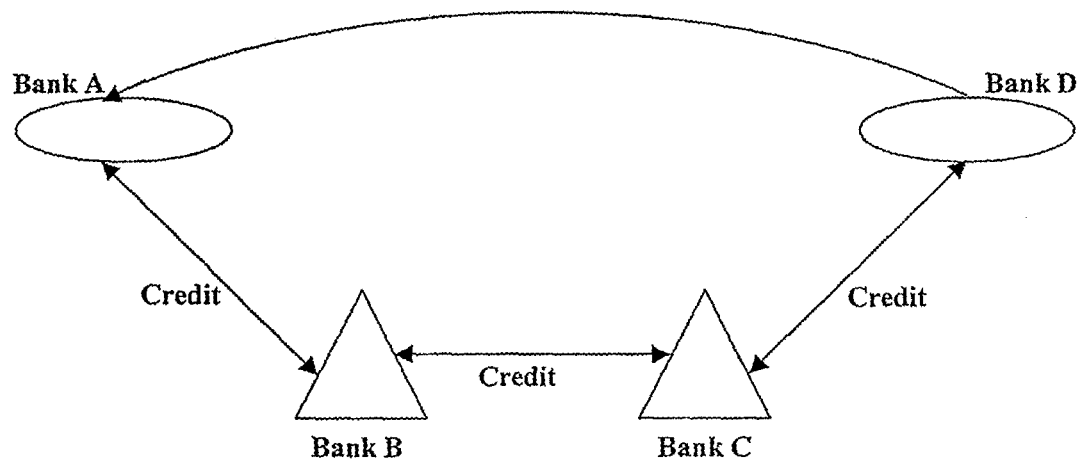
FIG. 3 is a view of credit limits assigned between four banks.
FIG. 4 shows how credit may be daisy chained to facilitate transactions between parties without direct bilateral credit.

FIG. 3 shows a simple example of prime brokerage. The figure illustrates (in EUR millions) the credit extended between four banks, banks A, B, C and D. Thus, Bank A has 100M credit with Bank B but no credit with bank C or D. Bank B has 100M credit with Banks A and C but no credit with Bank D. Bank C has 100M credit with both Banks B and D and Bank D only has 100M with Bank C.

If Bank A submits an order to buy 100 USD/EUR at up to 1.3840, and Bank D submits an order to sell 100 USD/EUR down to 1.3830, the matching engine will not make a match as there is no bilateral credit between A and D. However, Bank A has credit with Bank B, Bank B has credit with Bank C and Bank C has credit with Bank D. Banks B and C can provide their credit to allow the match to be made. In effect, the match is between A and B, B and C, and C and D. Credit is thus daisy chained to maximize the volume transacted. In return, prime broker banks receive a commission for allowing their credit to be used. The chain is illustrated in FIG. 4.

Figure 5:
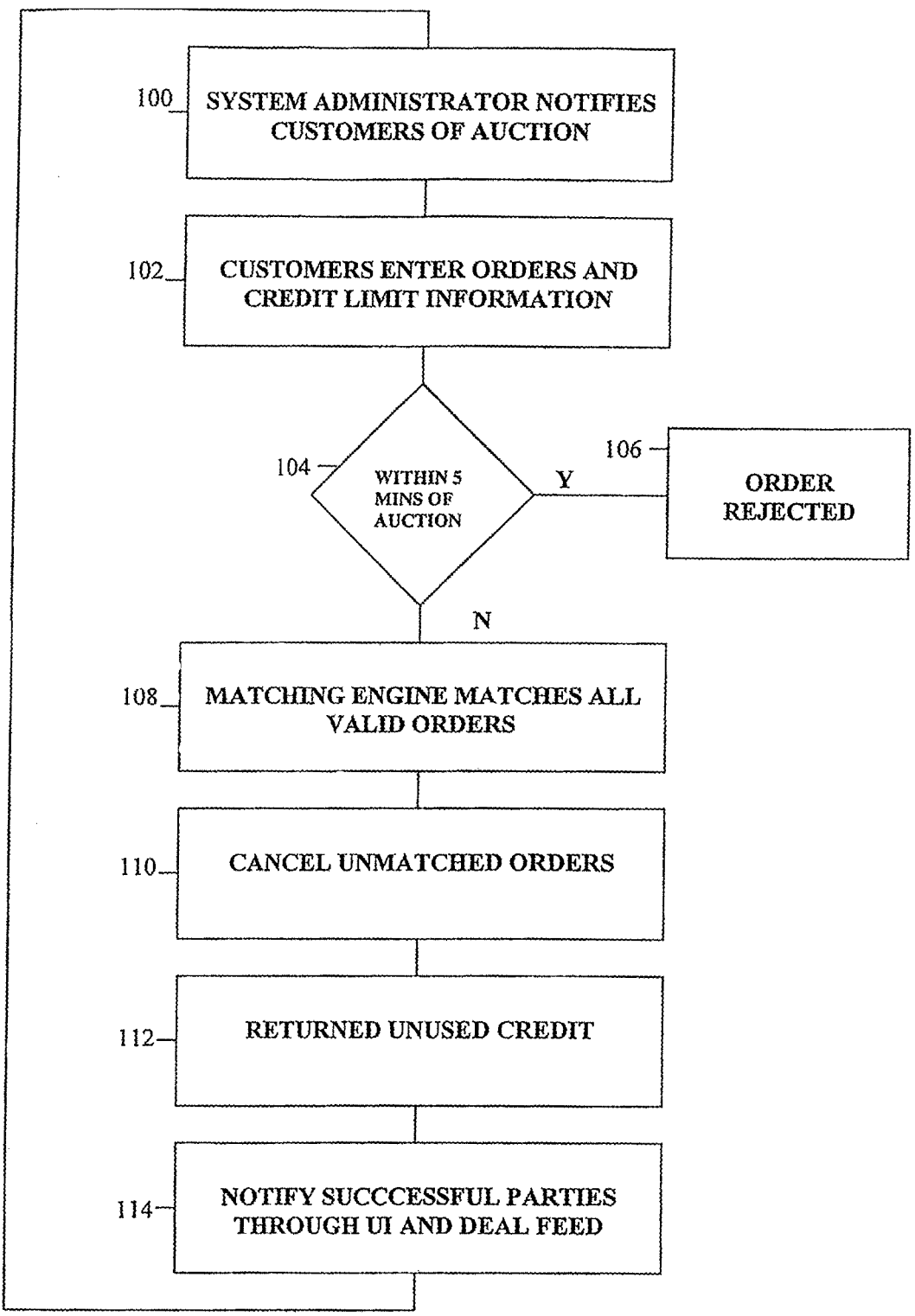
FIG. 5 is a flow chart of the auction process.

FIG. 5 shows a flow chart of the auction process. At step 100, the system administrator broadcasts to customers details of an auction to be held, including the instrument to be auctioned, the minimum order amount and the time of the auction. At step 102 customers enter, via their user interfaces, orders and credit limits, where these limits are not automatically renewed. These credit limits may include a willingness to act as or through a prime broker and the appropriate limits for such transactions. The system checks at 104 whether the orders and limits have been submitted 1 minute or more before the auction. If they have not, they are out of time and rejected at 106. At 108, the matching engine matches all valid orders and at 110 all unmatched orders are cancelled. At 112 all unused credit is returned to the customers. At step 114 successful parties are notified via their user interfaces and, if appropriate, their deal feed clients through the deal feed server. The process is then repeated for the next auction.

The embodiment of the invention described is useful to dealers needing to fulfil large customer orders, to proprietary dealers needing to square positions at the end of a trading day, to funds and large corporates wanting to use the credit pool on the system to conduct transactions more economically and to institutions wishing to earn fees by acting as prime brokers. Broker fees are reduced as the deal size is much bigger so there are less deals. Unlike existing anonymous systems, the existence of large orders in the market is not detectable by other parties and so prices are not negatively affected.

Most importantly, participants only allocate credit to the system for a short time before the auction and are notified of the outcome of the auction shortly after the auction. This allows unutilized credit to be unreserved so customers can quickly reserve that credit for other trading operations and so maximize their trading opportunities.

To a bank's customers, embodiments of the invention offer better prices as there is access to a large liquidity pool. As there is a defined time for order execution, customers benefit from knowing quickly whether their orders have been completed. Moreover, customers are certain that they will remain anonymous to all but those parties with whom they have traded.

The embodiment described conducts auctions on the basis of limit orders entered by participants. In one variation of the system and method, the system may be used to permit traders to trade at a defined benchmark price. Benchmarks are used in the industry to define a reliable reference for the instrument being traded at intervals throughout the trading day. Orders can be input to transact at particular benchmark fixings and can be matched instantly as price is not a variable; the only variable is bilateral credit. Traders may cancel orders at any time up to a cut-off time as discussed above. In this case, the cut-off is the benchmark fixing time rather than an auction time. Orders are entered into the system only with an amount and a reference to the benchmark fixing at which the trader wants to trade. The order can be filled prior to the time at which the benchmark is fixed, at which point the trade takes place.

This variation has the advantage of overcoming any uncertainty that the limit order-based system described above may provide. As traders do not know whether they have an open position until after the auction, there may be a rush to the market to cover open positions when the auction results are known. Dealing at a benchmark rate avoids the uncertainty of the limit order embodiment and prevents liquidity being channeled to certain points in the day.

Various other modifications to the embodiments described are possible and will occur to those skilled in the art without departing from the scope of the invention which is defined by the following claims.

The invention claimed is:

1. A method for reducing the processing power required to trade an instrument on a computerized trading system, the method comprising:
   storing data in the computerized trading system which identifies a benchmark fixing time at which a benchmark price for the instrument is set;
   storing data in the computerized trading system that assigns a credit limit to each of a plurality of participating trading entities;
   receiving, by the computerized trading system, a plurality of orders for the instrument, each of the plurality of received orders being from a respective trading entity of the plurality of participating trading entities, wherein each of the plurality of received orders includes a quantity, but not a price, indicating that the trading entity from which the order was received is willing to trade the instrument at the benchmark price;
   receiving, by the computerized trading system, instructions to cancel at least one of the plurality of received orders and canceling the at least one of the plurality of received orders only when the instructions to cancel are received prior to the benchmark fixing time;
   matching, by the computerized trading system, each of the plurality of received orders as it is received, with another previously received uncanceled and unmatched order of the plurality of received orders, causing the matching to be distributed over a period of time ending at the benchmark fixing time, wherein the matching is performed as a function of the credit limits of each of the plurality of trading entities;
   setting, by the computerized trading system at or after the benchmark fixing time, the benchmark price for the instrument; and
   executing the matched orders at the set benchmark price.

2. The method of claim 1, wherein the credit limits are only valid until the benchmark fixing time.

3. The method of claim 1, wherein at least one credit limit for a trading entity is reflective of a willingness to act as or through a prime broker.

4. The method of claim 1, wherein the credit limits are assigned no later than a first predetermined time before the period of time ending at the benchmark fixing time.

5. The method of claim 4, wherein the respective trading entity is notified of unused credit at a second predetermined time after the benchmark fixing time.

6. The method of claim 1, wherein credit in the credit limit is renewed automatically for future auctions on a request from a trading entity.

7. The method of claim 1, wherein trading entities wishing to participate must notify the computerized trading system of credit limits for various counterparties within the system.

8. The method of claim 7, wherein the trading entities also must notify the computerized trading system of credit limits the respective trading entity is willing to lend to counterparties trading on the computerized trading system.

9. The method of claim 1, wherein trading entities may cancel orders at any time up to a cut-off time prior to the benchmark fixing time.

10. A computerized trading system for reducing the processing power required to trade an instrument, the system comprising:

a memory operative to store data that identifies a benchmark fixing time at which a benchmark price for the instrument is set and data that assigns a credit limit to each of a plurality of participating trading entities;

an order receiver operative to receive a plurality of orders for the instrument, each of the plurality of received orders being from a respective trading entity of the plurality of participating trading entities, wherein each of the plurality of received orders includes a quantity, but not a price, indicating that the trading entity from which the order was received is willing to trade the instrument at the benchmark price;

the order receiver further operative to receive instructions to cancel at least one of the plurality of received orders and cancel the at least one of the plurality of received orders only when the instructions to cancel are received prior to the benchmark fixing time;

a match engine operative to match each of the plurality of received orders as it is received, with another previously received uncanceled and unmatched order of the plurality of received orders which causes the match process to be distributed over a period of time ending at the benchmark fixing time, wherein the matching is performed as a function of the credit limits of each of the plurality of trading entities; and an order processer operative to set the benchmark price at or after the benchmark fixing time and execute the matched orders at the set benchmark price.

11. The computerized trading system of claim 10, wherein the credit limits are only valid until the benchmark fixing time.

12. The computerized trading system of claim 10, wherein at least one credit limit for a trading entity is reflective of a willingness to act as or through a prime broker.

13. The computerized trading system of claim 10, wherein the credit limits are assigned no later than a first predetermined time before the period of time ending at the benchmark fixing time.

14. The computerized trading system of claim 13, wherein the respective trading entity is notified of unused credit at a second predetermined time after the benchmark fixing time.

15. The computerized trading system of claim 10, wherein credit in the credit limit is renewed automatically for future auctions on a request from a trading entity.

16. The computerized trading system of claim 10, wherein trading entities wishing to participate must notify the computerized trading system of credit limits for various counterparties within the system.

17. The computerized trading system of claim 16, wherein the trading entities also must notify the computerized trading system of credit limits the respective trading entity is willing to lend to counterparties trading on the computerized trading system.

18. The computerized trading system of claim 10, wherein trading entities may cancel orders at any time up to a cut-off time prior to the benchmark fixing time.

19. A system comprising a processor and a memory coupled therewith, the memory storing computer executable instructions that when executed by the processor cause the processor to:

store data that identifies a benchmark fixing time at which a benchmark price for the instrument is set;

store data that assigns a credit limit to each of a plurality of participating trading entities;

receive a plurality of orders for the instrument, each of the plurality of received orders being from a respective trading entity of the plurality of participating trading entities, wherein each of the plurality of received orders includes a quantity, but not a price, indicating that the trading entity from which the order was received is willing to trade the instrument at the benchmark price;

receive instructions to cancel at least one of the plurality of received orders and canceling the at least one of the plurality of received orders only if when the instructions to cancel were are received prior to the benchmark fixing time;

match each of the plurality of received orders as it is received, with another previously received uncanceled and unmatched order of the plurality of received orders, causing the matching to be distributed over a period of time ending at the benchmark fixing time, wherein the matching is performed as a function of the credit limits of each of the plurality of trading entities;

set the benchmark price for the instrument at or after the benchmark fixing time; and execute the matched orders at the set benchmark price.

20. The system of claim 19, wherein the credit limits are only valid until the benchmark fixing time.

* * * * *